United States Patent
Jian et al.

(10) Patent No.: US 12,218,406 B2
(45) Date of Patent: Feb. 4, 2025

(54) DISPLAY MODULE AND MOBILE TERMINAL

(71) Applicant: VIVO MOBILE COMMUNICATION CO., LTD., Chang'an Dongguan (CN)

(72) Inventors: Xianjing Jian, Chang'an Dongguan (CN); Lijun Zhu, Chang'an Dongguan (CN); Yijin Wang, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 247 days.

(21) Appl. No.: 17/552,096

(22) Filed: Dec. 15, 2021

(65) Prior Publication Data

US 2022/0109225 A1  Apr. 7, 2022

Related U.S. Application Data

(63) Continuation of application No. PCT/CN2020/095548, filed on Jun. 11, 2020.

(30) Foreign Application Priority Data

Jun. 26, 2019 (CN) .......................... 201910562658.4

(51) Int. Cl.
*H01Q 9/16* (2006.01)
*G06F 3/041* (2006.01)
(Continued)

(52) U.S. Cl.
CPC ............. *H01Q 1/22* (2013.01); *G06F 3/0412* (2013.01); *H01Q 1/243* (2013.01); *H01Q 9/16* (2013.01);
(Continued)

(58) Field of Classification Search
CPC .......... H01Q 1/243; H01Q 9/16; H01Q 9/285; H01Q 21/28
See application file for complete search history.

(56) References Cited

U.S. PATENT DOCUMENTS

2004/0021608 A1\* 2/2004 Kojima ................ H01Q 19/005
  343/702
2010/0240327 A1 9/2010 Lambrecht et al.
(Continued)

FOREIGN PATENT DOCUMENTS

CN  102882545 A  1/2013
CN  103294247 A  9/2013
(Continued)

OTHER PUBLICATIONS

Japanese first Office Action related to Application No. 2021-574993; reported on Jan. 23, 2023.
(Continued)

*Primary Examiner* — Dameon E Levi
*Assistant Examiner* — Leah Rosenberg
(74) *Attorney, Agent, or Firm* — von Briesen & Roper, s.c.

(57) ABSTRACT

The present disclosure provides a display module and a mobile terminal. The display module includes a screen cover plate, a first antenna array, a first flexible circuit board, and a first radio frequency integrated circuit; where the first antenna array is arranged in a first region of the screen cover plate; the first radio frequency integrated circuit is arranged on the first flexible circuit board, and is electrically connected to the first antenna array through the first flexible circuit board.

17 Claims, 5 Drawing Sheets

(51) Int. Cl.
  *H01Q 1/22* (2006.01)
  *H01Q 1/24* (2006.01)
  *H01Q 9/28* (2006.01)
  *H01Q 21/08* (2006.01)
  *H01Q 21/28* (2006.01)

(52) U.S. Cl.
  CPC ............ *H01Q 9/285* (2013.01); *H01Q 21/08* (2013.01); *H01Q 21/28* (2013.01); *G06F 2203/04102* (2013.01)

(56) References Cited

U.S. PATENT DOCUMENTS

| | | | |
|---|---|---|---|
| 2011/0227795 | A1 | 9/2011 | Lopez |
| 2013/0229362 | A1 | 9/2013 | Liu |
| 2014/0087658 | A1 | 3/2014 | Hou |
| 2018/0026341 | A1 | 1/2018 | Mow et al. |
| 2019/0027808 | A1* | 1/2019 | Mow ............... H04R 5/04 |
| 2019/0036207 | A1* | 1/2019 | Kim ............... H01Q 21/08 |
| 2019/0058264 | A1* | 2/2019 | Jung ............... H01Q 9/0435 |
| 2019/0104212 | A1* | 4/2019 | Lee ............... H01Q 9/0435 |
| 2019/0113609 | A1* | 4/2019 | Baheti ............... H01Q 9/0457 |
| 2020/0076055 | A1 | 3/2020 | Jeon et al. |
| 2021/0126348 | A1* | 4/2021 | Kim ............... H01Q 1/243 |
| 2023/0089409 | A1* | 3/2023 | Woo ............... H04B 7/0404 455/73 |
| 2024/0283166 | A1* | 8/2024 | Sung ............... G01S 13/62 |

FOREIGN PATENT DOCUMENTS

| | | |
|---|---|---|
| CN | 106229626 A | 12/2016 |
| CN | 106708298 A | 5/2017 |
| CN | 106876881 A | 6/2017 |
| CN | 206628591 U | 11/2017 |
| CN | 108521499 A | 9/2018 |
| CN | 108881527 A | 11/2018 |
| CN | 110312009 A | 10/2019 |
| JP | 2003110329 A | 4/2003 |
| JP | 2016100794 A | 5/2016 |
| JP | 3212835 U | 10/2017 |
| JP | 6437285 B2 * | 12/2018 |
| KR | 20100022792 A | 3/2010 |
| KR | 20100061499 A | 6/2010 |
| KR | 20190038264 A | 4/2019 |
| WO | 2018221879 A1 | 12/2018 |

OTHER PUBLICATIONS

Korean first Office Action related to Application No. 10-2021-7041499; reported on Mar. 6, 2023.

International search report and written opinion related to Application No. PCT/CN2020/095548 reported on Jul. 23, 2020.

Office Action related to Application No. 201910562658.4 reported on Jun. 24, 2020.

Extended European Search Report for related Application No. 20830933.6: reported on Jul. 11, 2022.

* cited by examiner

DISPLAY MODULE AND MOBILE TERMINAL

CROSS-REFERENCE TO RELATED APPLICATION

This application is a continuation application of International Application No. PCT/CN2020/095548 filed on Jun. 11, 2020, which claims priority to Chinese Patent Application No. 201910562658.4 filed in China on Jun. 26, 2019, which are incorporated herein by reference in their entireties.

TECHNICAL FIELD

The present disclosure relates to the technical field of communications equipment, and in particular, to a display module and a mobile terminal.

BACKGROUND

The rapid development of radio communications technologies, especially the upcoming commercial use of 5G, is bringing more and more abundant application scenarios for a radio communications system, and imposing higher requirements on antennas, which are one of the crucial components of the radio communications system. On the one hand, in some application scenarios, antennas need to be conformal, concealed, and safe in order to be integrated into wireless products such as cars, smart wearables, and smart homes. On the other hand, the increasingly higher transmission rate and greater communications capacity of the radio communications system require higher carrier frequencies, which in return causes more and more path loss. As a result, it's required to improve the gain for the array antenna to overcome the influence of path loss. In order to achieve high gain and beam sweeping or beamforming at the same time, it is required to use the phased antenna array technology, thereby requiring integrating more and more antennas in a limited space and thus requiring exploring other antenna space on the basis of the conventional antenna design methods. Especially, the rise of 5G and the popular full screens of mobile phones (or other radio communications products) have increased the number of antennas, while pursuing the effect of ultimate full screen has led to continuous compression of the space for antennas.

The current mainstream design solutions for millimeter-wave antennas primarily use the Antenna in Package (AIP) technology and process, that is, to integrate the millimeter-wave array antenna, radio frequency integrated circuit (RFIC) and power management integrated module (PMIC) into one module. In practical applications, such a module is built into the mobile phone, thus it will occupy the space for other current antennas, resulting in the degradation of antenna performance.

SUMMARY

The embodiments of the present disclosure provide a display module and a mobile terminal to resolve the problem that an antenna array occupies the space for other current antennas, resulting in the degradation of antenna performance.

In a first aspect, an embodiment of the present disclosure provides a display module applied to a mobile terminal, the display module including a screen cover plate, a first antenna array, a first flexible circuit board, and a first radio frequency integrated circuit; where
  the first antenna array is arranged in a first region of the screen cover plate; and
  the first radio frequency integrated circuit is arranged on the first flexible circuit board, and is electrically connected to the first antenna array through the first flexible circuit board.

In the second aspect, an embodiment of the present disclosure further provides a mobile terminal, where the mobile terminal includes a display module and a carrier for carrying the display module; the display module includes a screen cover plate, a first antenna array, and a first flexible circuit board and a first radio frequency integrated circuit; where
  the first antenna array is arranged in a first region of the screen cover plate; and
  the first radio frequency integrated circuit is arranged on the first flexible circuit board, and is electrically connected to the first antenna array through the first flexible circuit board.

In the embodiment of the present disclosure, a first antenna array is arranged in a first region of a screen cover plate, and beam sweeping or beamforming is performed on a region above a screen by using the first antenna array. The antenna array designed in the embodiment of the present disclosure does not need to occupy the space for other antennas arranged on a back cover of a mobile terminal, thereby improving the performance of an antenna. In addition, by designing an antenna array on the glass substrate material of the screen, and multiplexing the dielectric substrate of the screen cover plate, a size of the antenna can be further reduced due to the high dielectric constant of the glass substrate.

DESCRIPTION OF EMBODIMENTS

The technical solutions in the embodiments of the present disclosure are described below clearly with reference to the accompanying drawings in the embodiments of the present disclosure. Clearly, the described embodiments are some rather than all of the embodiments of the present disclosure. All other embodiments obtained by a person of ordinary skill in the art based on the embodiments of the present disclosure shall fall within the protection scope of the present disclosure.

Unless otherwise defined, the technical terms or scientific terms used in the present disclosure shall have the general meanings understood by a person having ordinary skill in the field in which the present disclosure falls. The "first", "second" and similar words used in the present disclosure are only intended to distinguish different components, rather than to indicate any order, quantity or importance. Similarly, similar words such as "one piece" or "one" indicates the presence of at least one, rather than indicating a quantity limit. Similar words such as "connect" or "connection" are not limited to physical or mechanical connections, but may include electrical connections, no matter it is direct or indirect. "Upper", "lower", "left", "right", and the like are only intended to indicate a relative positional relationship. When the absolute position of the described object changes, the relative positional relationship changes accordingly as well.

Figure 1:
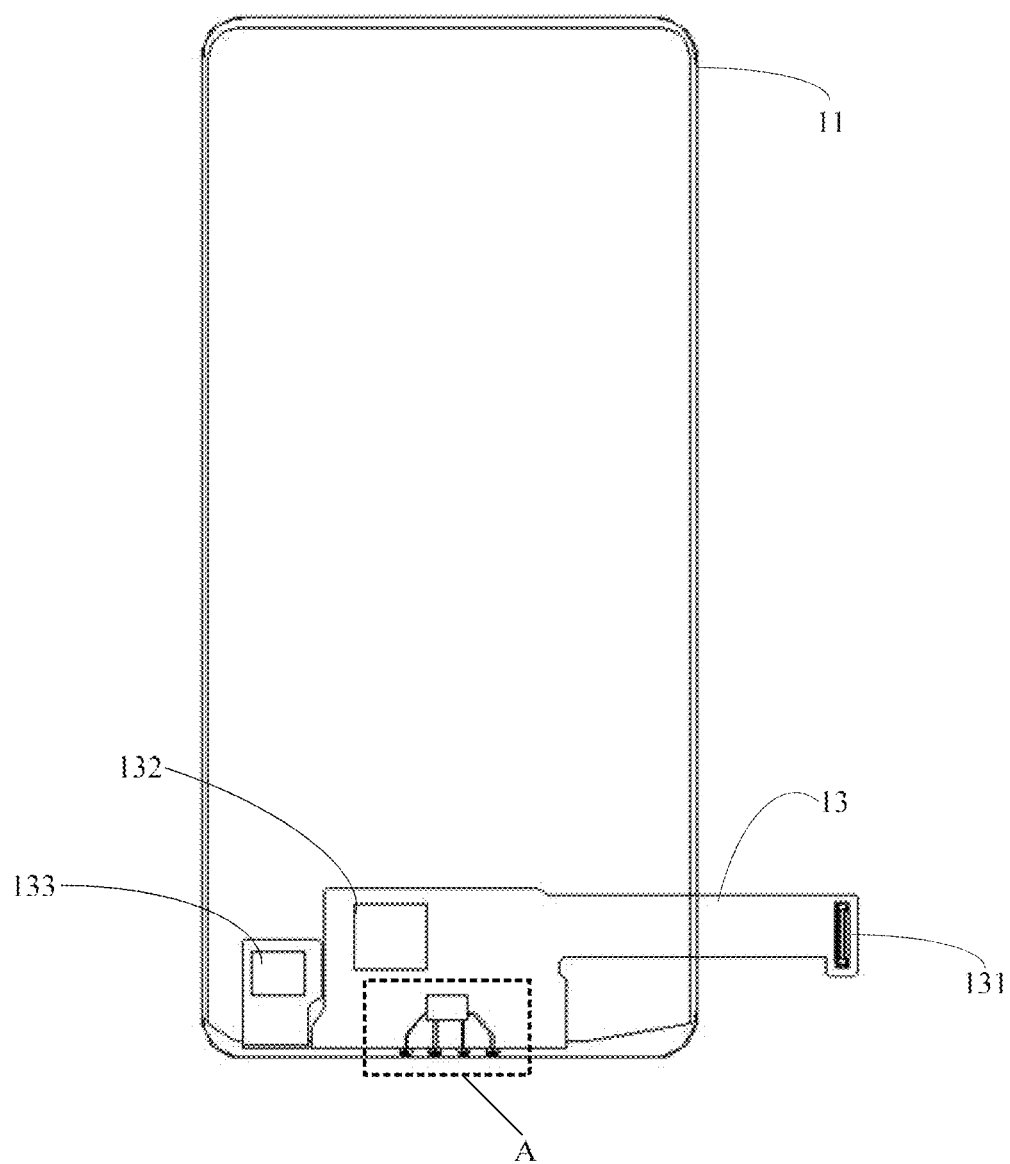
FIG. 1 is a structural diagram 1 of a display module provided by an embodiment of the present disclosure.
Figure 2:
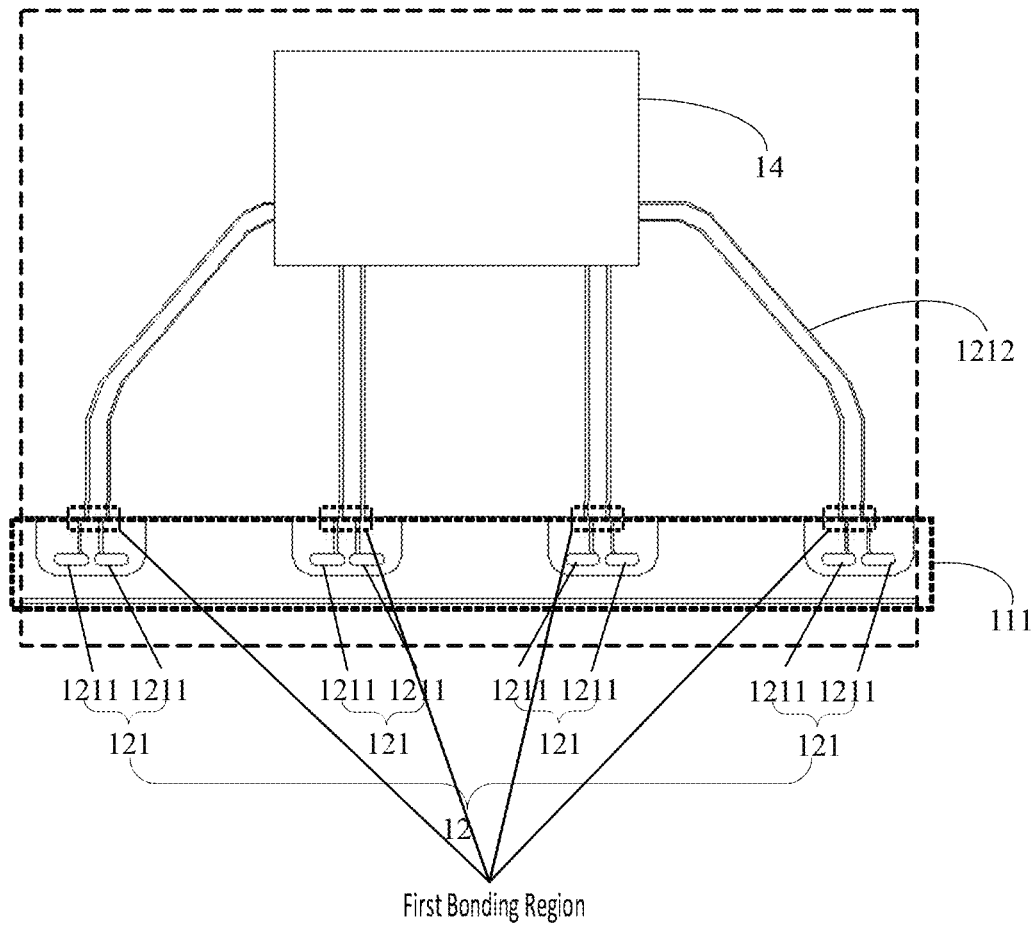
FIG. 2 is a schematic diagram of an enlarged structure of A in FIG. 1.

Referring to FIG. 1 and FIG. 2, an embodiment of the present disclosure provides a display module applied to a mobile terminal, including a screen cover plate 11, a first antenna array 12, a first flexible circuit board 13 and a first radio frequency integrated circuit 14; where the first antenna array 12 is arranged in a first region 111 of the screen cover plate 11;

the first radio frequency integrated circuit 14 is arranged on the first flexible circuit board 13 and is electrically connected to the first antenna array 12 through the first flexible circuit board 13.

Generally, the foregoing screen cover plate is generally a glass cover plate. It may be made of other transparent non-metallic materials in the practical application. The foregoing first region is a region free of any metal component and only having glass medium or plastic medium, which is usually referred to as a clearance region, for example, in a mobile terminal. A position of the foregoing first region 111 may be set according to an actual need, and may be set at an upper or lower end of the screen cover plate 11. The upper and lower ends of the screen cover plate 11 are relative to the overall structure of a mobile terminal. Generally, a front-facing camera is set at an upper end of a mobile terminal and a microphone is set at a lower end of a mobile terminal. As shown in FIG. 1, in this embodiment of the present disclosure, the foregoing first region 1/1 is located at the lower end of the screen cover plate 11.

A width of the first region may be set according to an actual need. For example, in this embodiment, the foregoing first antenna array 12 may be set in a region with a width of less than 1 mm.

It should be understood that a frequency for the first antenna array 12 to receive and transmit a beam may be set according to an actual need. For example, in this embodiment of the present disclosure, the frequency for the first antenna array 12 to receive and transmit a beam may be 60 GHz. It should be noted that the foregoing first antenna array may be referred to as a millimeter-wave antenna array according to its wavelength.

In this embodiment of the present disclosure, a connection point may be set on the first flexible circuit board 13. After the first flexible circuit board 13 is fitted with the screen cover plate 11, an electrical connection relationship between the first flexible circuit board 13 and a conductive wire on the screen cover plate 11 can be achieved based on this connection point, and an electrical connection between the first flexible circuit board 13 and the first antenna array 12 can be achieved at the same time. A conductive circuit is arranged on the first flexible circuit board 13, and the first radio frequency integrated circuit 14 can be electrically connected to the first antenna array 12 through the conductive circuit and the connection point. In addition, in order to improve the stability of connection, the first flexible circuit board 13 may be welded and fixed to the screen cover plate 11 through the connection point.

In the embodiment of the present disclosure, a first antenna array 12 is arranged in a first region 111 of a screen cover plate 11, and beam sweeping or beamforming is performed on a region above the screen by using the first antenna array 12. The antenna array designed in the embodiment of the present disclosure does not need to occupy the space for other antennas arranged on a back cover of a mobile terminal, thereby improving the performance of an antenna. In addition, by designing an antenna array on the glass substrate material of the screen, and multiplexing the dielectric substrate of the screen cover plate, a size of the antenna can be further reduced due to the high dielectric constant of the glass substrate.

The foregoing mobile terminal may include at least one of: a mobile phone, a tablet computer, an e-book reader, an MP3 player, an MP4 player, a digital camera, a laptop computer, a vehicle-mounted computer, a desktop computer, a set-top box, a smart television set, and a wearable device.

Further, a first connector 131 is arranged on the foregoing first flexible circuit board 13, and the first radio frequency integrated circuit 14 is electrically connected to the main board of the mobile terminal through the first connector 131.

In this embodiment of the present disclosure, the foregoing first connector 131 may be a board to board (BTB) connector. The first connector 131 is configured to achieve electrical connection between the first flexible circuit board 13 and the main board, thereby ensuring the independence between the first flexible circuit board 13 and the main board while facilitating both disassembly and assembly.

Further, based on the foregoing embodiment, in this embodiment of the present disclosure, the foregoing first flexible circuit board 13 is further provided with a screen driver chip 132 and a touch detection chip 133, and the screen driver chip 132 and the touch detection chip 133 are connected to the main board through the first connector 131.

The foregoing screen driver chip 132 may be a driver chip for a display screen to drive the display of the display screen, and the foregoing touch detection chip 133 is electrically connected to the screen cover plate 11 to detect information that the screen cover plate 11 is touched. In this embodiment of the present disclosure, the screen driver chip 132 and the touch detection chip 133 are arranged on the first flexible circuit board 13, and share the first connector 131 with the first radio frequency integrated circuit 14 to achieve a connection with the main board. For that reason, space can be saved in an effective way, which is advantageous to the miniaturization of the mobile terminal.

A structure of the foregoing first antenna array 12 may be set according to an actual need. As shown in FIG. 2, in this embodiment of the present disclosure, the foregoing first antenna array 12 includes at least two first dipole antenna elements 121, where the first dipole antenna element 121 includes two first dipole antennas 1211 arranged in parallel.

In this embodiment of the present disclosure, a quantity of the foregoing first dipole antenna elements 121 may be set to four, where each of the first dipole antenna elements 121 includes two first dipole antennas 1211. Among them, the two first dipole antennas 1211 in the first dipole antenna element 121 are arranged at intervals in the length direction of the first dipole antenna 1211, and shapes and sizes of the two first dipole antennas 1211 may be consistent. A length of the first dipole antenna 1211 may be set to 0.55 mm, a width may be set to 0.2 mm, and a distance between the two first dipole antennas 1211 may be 0.1 mm.

Optionally, a first bonding region (not shown in the figure) and a first feeder line 1212 corresponding to each of the first dipole antenna elements 1211 are arranged on the screen cover plate 11. One end of the first feeder line 1212 is electrically connected to a corresponding first dipole antenna element 1211, and the other end is electrically connected to a corresponding first bonding region, where the first bonding region is electrically connected to the first flexible circuit board 13.

In this embodiment of the present disclosure, a connection point of the first flexible circuit board 13 may be electrically connected to the first bonding region through a process of thermal connection. For a specific connecting method, reference may be made to related technologies, which is not further limited herein. As shown in FIG. 2, the first feeder line 1212 is led out from ends (that is, opposite ends) of two opposite arms of the two first dipole antennas 1211, and extends to the first bonding region of the screen cover plate 11. Optionally, differential feeding may be used for the two first dipole antennas 1211 of the foregoing first dipole antenna element 121, that is, amplitudes of signals from a pin of the first radio frequency integrated circuit 14 are equal, with a phase difference of 180°. As a differential feeding method is adopted, the lengths of the two first feeder lines 1212 of the first dipole antenna element 121 are required to be the same as possible. If there is a difference, a phase of an output signal from the first radio frequency integrated circuit 14 may be compensated.

Figure 3:
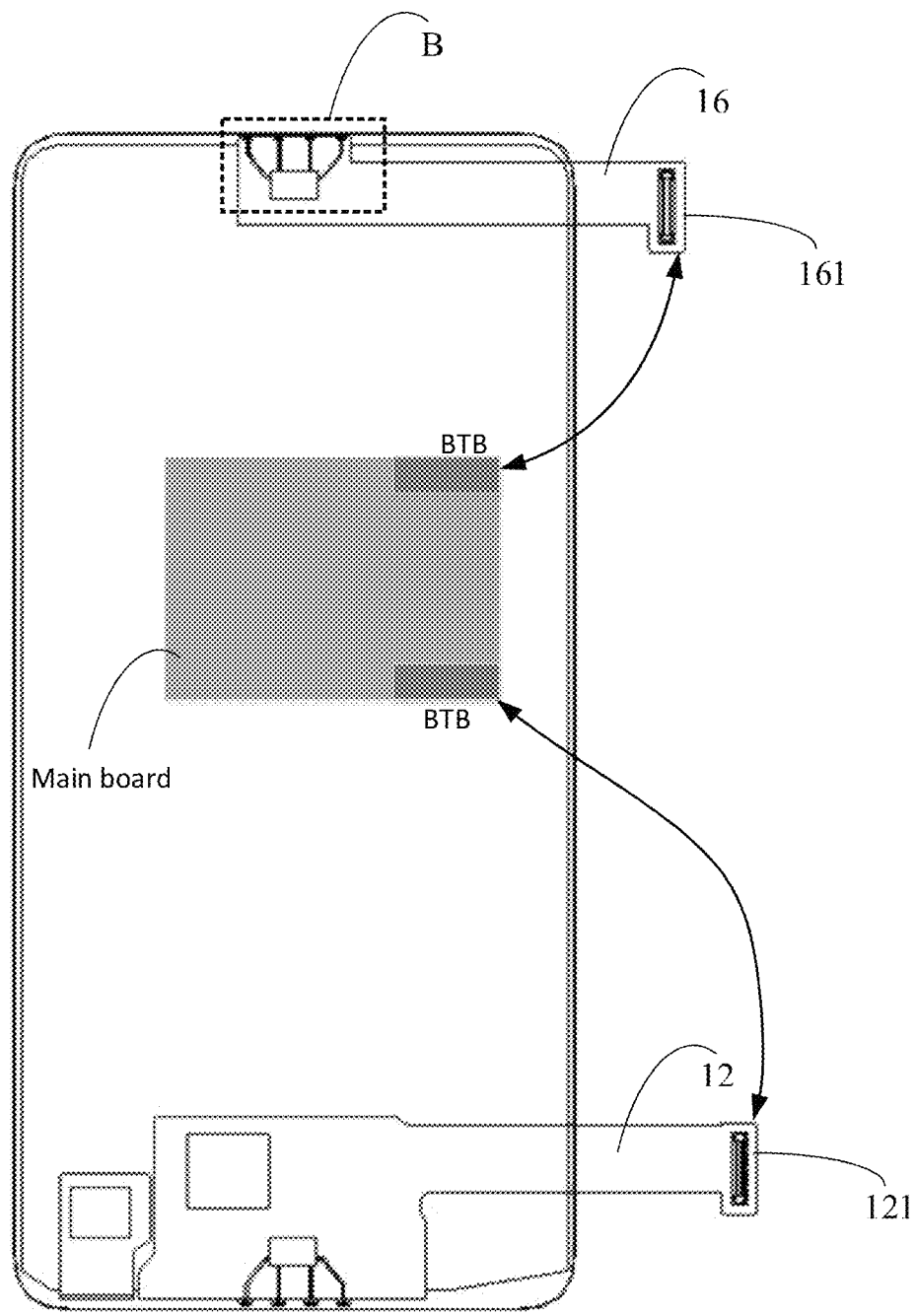
FIG. 3 is a structural diagram 2 of a display module provided by an embodiment of the present disclosure.
Figure 4:
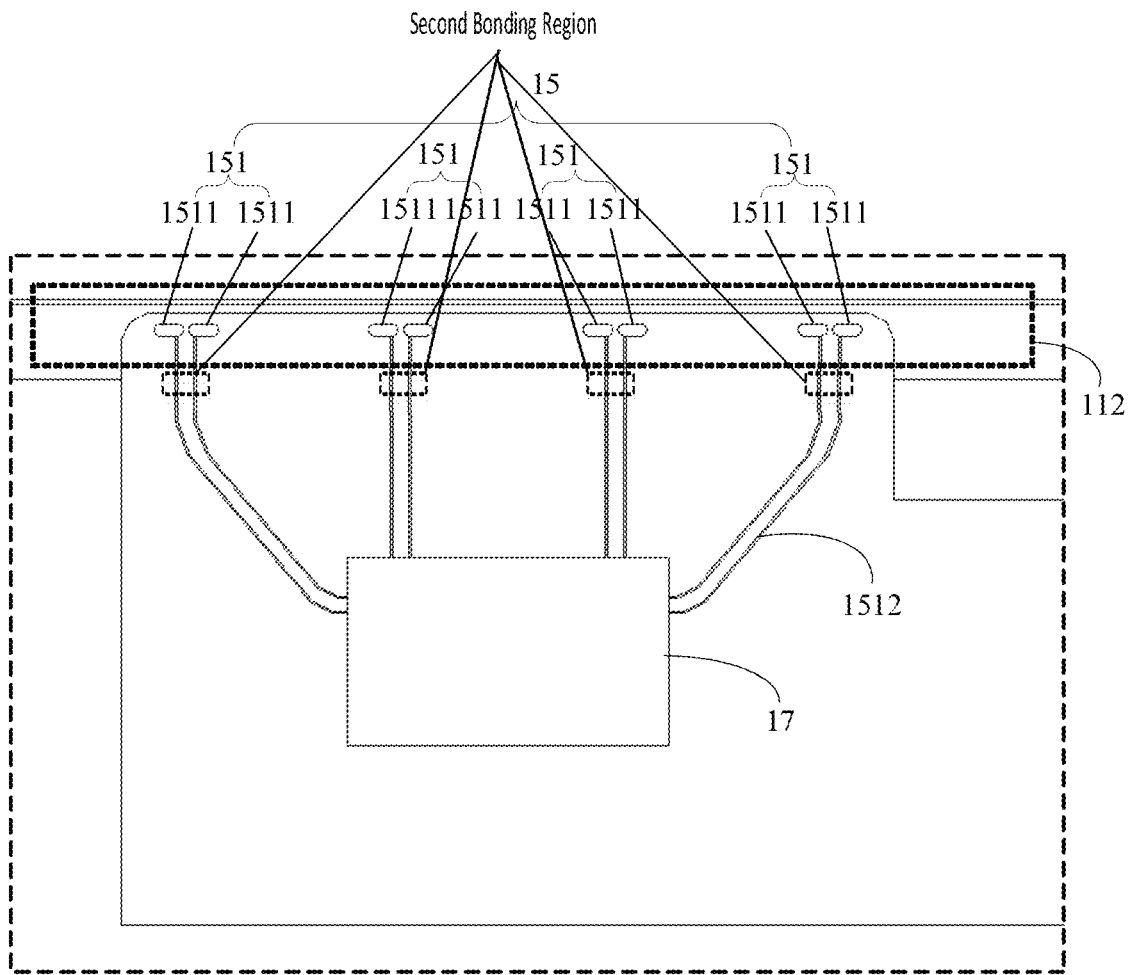
FIG. 4 is a schematic diagram of an enlarged structure of B in FIG. 3.
Figure 5:
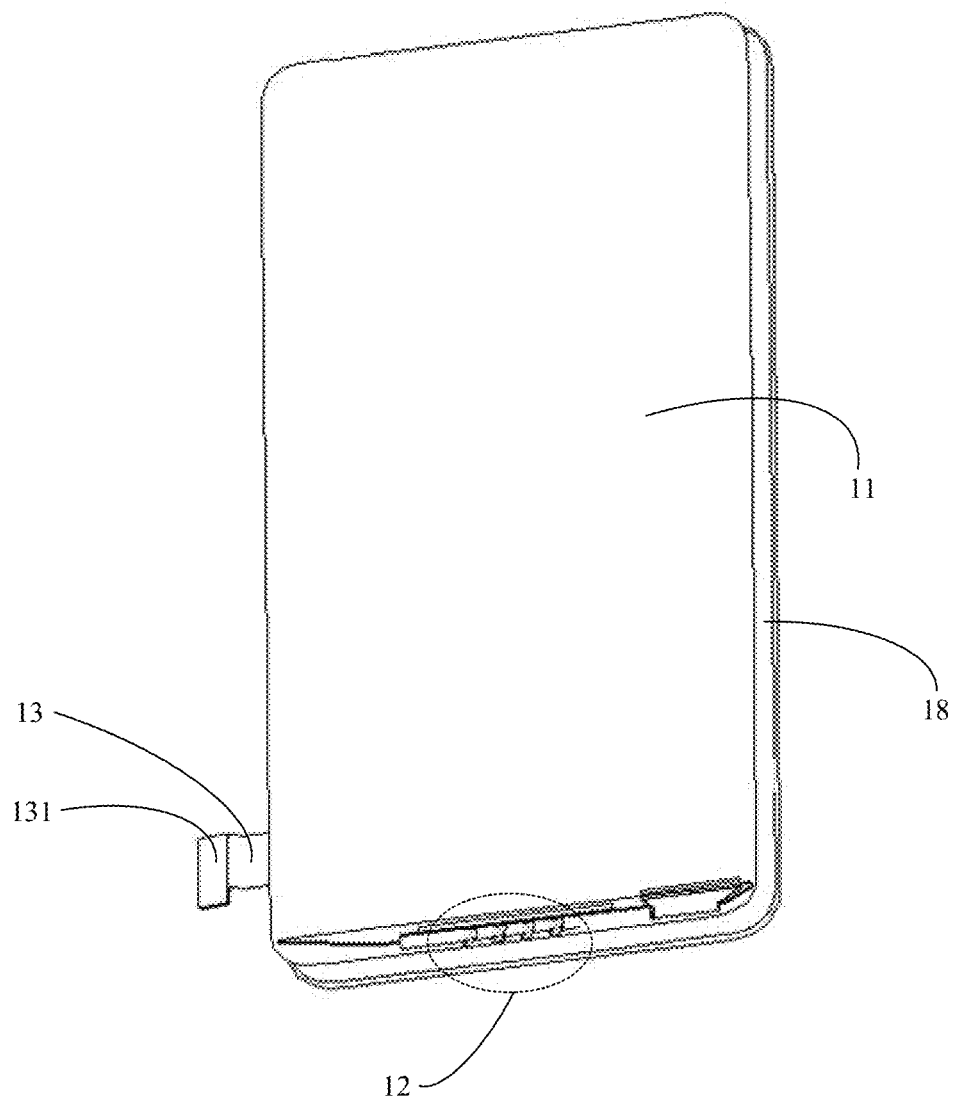
FIG. 5 is a structural diagram of a mobile terminal provided by an embodiment of the present disclosure.

Further, as shown in FIG. 3 and FIG. 4, the display module further includes a second antenna array 15, a second flexible circuit board 16, and a second radio frequency integrated circuit 17, where the second antenna array 15 is arranged in a second region 112 of the screen cover plate 11, and the second region 112 and the first region 111 are located at two opposite ends of the screen cover plate 11; and the second radio frequency integrated circuit 17 is arranged on the second flexible circuit board 16 and is electrically connected to the second antenna array 15 through the second flexible circuit board 16.

In this embodiment of the present disclosure, the foregoing second region 112 is located at the upper end of the screen cover plate 11, and a structure of this second region is consistent with that of the first region 111, but they are located in different positions. A structure of the second antenna array 15 may be consistent with that of the first antenna array 12. For example, the second antenna array 15 includes at least two second dipole antenna elements 151, and the second dipole antenna element 151 includes two second dipole antennas 1511 arranged in parallel. The two second dipole antennas 1511 in the second dipole antenna element 151 are arranged at intervals in the length direction of the second dipole antenna 1511, and shapes and sizes of the two second dipole antennas 1511 may be consistent. A length of the second dipole antenna 1511 may be set to 0.55 mm, a width may be set to 0.2 mm, and a distance between the two second dipole antennas 1511 may be 0.1 mm.

It should be noted that the second antenna array may be referred to as a millimeter-wave antenna array according to a wavelength of a beam transmitted and received by this second antenna array.

In this embodiment of the present disclosure, as the second antenna array 15 is arranged, the spatial coverage of the antenna can be improved. In addition, the first antenna array 12 and the second antenna array 15 may be switched for use. For example, when a user touches the first region 111, data may be transmitted and received through the second antenna array 15; when a user touches the second region 112, data may be transmitted and received through the first antenna array 12; in this way, the quality of radio communications is improved.

Optionally, a second bonding region (not shown in the figure) and a second feeder line 1512 corresponding to each of the second dipole antenna elements 1511 are arranged on the screen cover plate 11. One end of the second feeder line 1512 is electrically connected to a corresponding second dipole antenna element 1511, and the other end is electrically connected to a corresponding second bonding region, where the second bonding region is electrically connected to the second flexible circuit board 16.

In this embodiment of the present disclosure, a connection point of the second flexible circuit board 16 may be electrically connected to the second bonding region through a process of thermal connection. For a specific connecting method, reference may be made to related technologies, which is not further limited herein. As shown in FIG. 4, the second feeder line 1512 is led out from ends (that is, opposite ends) of two opposite arms of the two first dipole antennas 1211, and extends to the second bonding region of the screen cover plate 11. Optionally, differential feeding may be used for the two second dipole antennas 1511 of the foregoing second dipole antenna element 151, that is, amplitudes of signals from a pin of the second radio frequency integrated circuit 17 are equal, with a phase difference of 180°. As a differential feeding method is adopted, the lengths of the two second feeder lines 1512 of the second dipole antenna element 151 are required to be the same as possible. If there is a difference, a phase of an output signal from the second radio frequency integrated circuit 17 may be compensated.

Further, a second connector 161 is arranged on the foregoing second flexible circuit board 16, and the second radio frequency integrated circuit 17 is electrically connected to the main board of the mobile terminal through the second connector 161.

In this embodiment of the present disclosure, the foregoing second connector 161 may be a board to board (BTB) connector. The second connector 161 is configured to achieve electrical connection between the second flexible circuit board 16 and the main board, thereby ensuring the independence between the second flexible circuit board 16 and the main board while facilitating both disassembly and assembly.

Further, as shown in FIG. 1 to FIG. 5, an embodiment of the present disclosure further provides a mobile terminal. The mobile terminal includes a display module and a carrier 18 carrying the display module. The carrier 18 may be a front case or a middle frame. The foregoing display module is the display module in the foregoing embodiment. For a structure of this display module, reference may be made to the description of the foregoing embodiment, and details are not repeated herein. As the display module in the foregoing embodiment is adopted, a mobile terminal provided in this embodiment has all beneficial effects of the display module in the foregoing embodiment.

Further, the carrier 18 is a metal carrier, and the metal carrier is used as a reflector for the antenna array of the display module.

In this embodiment of the present disclosure, there may be certain spacing between the foregoing metal carrier and the antenna array in the thickness direction of the mobile terminal.

This spacing may be understood as a vertical distance from each first dipole antenna element 121 in the first antenna array 12 to the carrier 18 in the thickness direction of the mobile terminal, and a vertical distance from each second dipole antenna element 151 in the second antenna array 15 to the carrier 18 in the thickness direction of the mobile terminal, and a size of such spacing may be set according to an actual need.

The foregoing carrier 18 may be made of metal material at a position corresponding to the first antenna array 12 and the second antenna array 15 in the thickness direction, or may be made of metal material as a whole, which is not further limited herein. As the carrier 18 is a metal carrier, it may act as a reflector for the antenna army, which can make the maximum radiation direction of the antenna array face the side of the screen, thereby increasing the gain of the first antenna array 12 and the second antenna array 15, and enhancing the radio communications quality.

The foregoing spacing of different sizes imposes different influences on a parameter S of the antenna element. In this embodiment, the vertical distance from each first dipole antenna element 121 to the carrier 18 is set to 0.37 mm, and the vertical distance from each second dipole antenna element 151 to the carrier 18 is set to 0.37 mm. In this way, the beam for 60 GHz frequency can improve the communications quality to the greatest extent.

Further, based on the foregoing embodiment, in this embodiment, in the case that the display module includes a first antenna array 12, a first radio frequency integrated circuit 14, a second antenna array 15 and a second radio frequency integrated circuit 17, the mobile terminal further includes a control chip, where the control chip is electrically connected to the first radio frequency integrated circuit 14 and the second radio frequency integrated circuit 17 respectively;

where when a first region 111 is touched, the control chip controls the second radio frequency integrated circuit 17 to transmit and receive data through the second antenna array 15; and when a second region 112 is touched, the control chip controls the first radio frequency integrated circuit 14 to transmit and receive data through the first antenna array 12.

In this embodiment of the present disclosure, the foregoing control chip may be set on the main board and configured to control work states of the first radio frequency integrated circuit 14 and the second radio frequency integrated circuit 17. Additionally, the control chip may further be electrically connected to a touch detection chip 133, and determine touch states of the first region 111 and the second region 112 according to a user's touch position detected by the touch detection chip 133, and thus control the work states of the first radio frequency integrated circuit 14 and the second radio frequency integrated circuit 17.

When the user touches the first region 111, data is transmitted and received through the second antenna array 15; when the user touches the second region 112, data is transmitted and received through the first antenna array 12; in this way, the radio communications quality of the mobile terminal is enhanced.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A display module applied to a mobile terminal, comprising a screen cover plate, a first antenna array, a first flexible circuit board and a first radio frequency integrated circuit; wherein, the first antenna array is arranged in a first region of the screen cover plate; and the first radio frequency integrated circuit is arranged on the first flexible circuit board, and is electrically connected to the first antenna array through the first flexible circuit board, wherein the first antenna array comprises at least two first dipole antenna elements, and the first dipole antenna element comprises two first dipole antennas arranged in parallel, wherein a first bonding region and a first feeder line corresponding to each of the first dipole antenna elements are arranged on the screen cover plate, and one end of the first feeder line is electrically connected to a corresponding first dipole antenna element, and the other end is electrically connected to a corresponding first bonding region, wherein the first bonding region is electrically connected to the first flexible circuit board, the first flexible circuit board is fixed to the screen cover plate, wherein the first radio frequency integrated circuit, the first flexible circuit board and the first antenna array are located on a same surface of the screen cover plate.

2. The display module according to claim 1, wherein a first connector is arranged on the first flexible circuit board, and the first radio frequency integrated circuit is electrically connected to a main board of the mobile terminal through the first connector.

3. The display module according to claim 2, wherein the first flexible circuit board is further provided with a screen driver chip and a touch detection chip, and the screen driver chip and the touch detection chip are connected to the main board through the first connector.

4. The display module according to claim 1, wherein the display module further comprises a second antenna array, a second flexible circuit board and a second radio frequency integrated circuit, wherein the second antenna array is arranged in a second region of the screen cover plate, and the second region and the first region are located at two opposite ends of the screen cover plate; and the second radio frequency integrated circuit is arranged on the second flexible circuit board, and is electrically connected to the second antenna array through the second flexible circuit board.

5. The display module according to claim 4, wherein a second connector is arranged on the second flexible circuit board, and the second radio frequency integrated circuit is electrically connected to a main board of the mobile terminal through the second connector.

6. The display module according to claim 4, wherein the second antenna array comprises at least two second dipole antenna elements, and the second dipole antenna element comprises two second dipole antennas arranged in parallel.

7. The display module according to claim 6, wherein a second bonding region and a second feeder line corresponding to each of the second dipole antenna elements are arranged on the screen cover plate, and one end of the second feeder line is electrically connected to a corresponding second dipole antenna element, and the other end is electrically connected to a corresponding second bonding region, wherein the second bonding region is electrically connected to the second flexible circuit board.

8. The display module according to claim 4, wherein the second antenna array is a millimeter-wave antenna array.

9. The display module according to claim 1, wherein the first antenna array is a millimeter-wave antenna array.

10. A mobile terminal, comprising a display module and a carrier for carrying the display module; wherein the display module comprises a screen cover plate, a first antenna array, a first flexible circuit board and a first radio frequency integrated circuit; wherein, the first antenna array is arranged in a first region of the screen cover plate; and the first radio frequency integrated circuit is arranged on the first flexible circuit board, and is electrically connected to the first antenna array through the first flexible circuit board, wherein the first antenna array comprises at least two first dipole antenna elements, and the first dipole antenna element comprises two first dipole antennas arranged in parallel, wherein a first bonding region and a first feeder line corresponding to each of the first dipole antenna elements are arranged on the screen cover plate, and one end of the first feeder line is electrically connected to a corresponding first dipole antenna element, and the other end is electrically connected to a corresponding first bonding region, wherein the first bonding region is electrically connected to the first flexible circuit board, the first flexible circuit board is fixed to the screen cover plate, wherein the first radio frequency integrated circuit, the first flexible circuit board and the first antenna array are located on a same surface of the screen cover plate.

11. The mobile terminal according to claim 10, wherein the carrier is a metal carrier, and the metal carrier is used as a reflector for an antenna array of the display module.

12. The mobile terminal according to claim 10, wherein, the display module further comprises a second antenna array, and a second radio frequency integrated circuit, and the mobile terminal further comprises a control chip, wherein the control chip is electrically connected to the first radio frequency integrated circuit and the second radio frequency integrated circuit respectively;
wherein when a first region is touched, the control chip controls the second radio frequency integrated circuit to transmit and receive data through the second antenna array; and
when a second region is touched, the control chip controls the first radio frequency integrated circuit to transmit and receive data through the first antenna array.

13. The mobile terminal according to claim 10, wherein a first connector is arranged on the first flexible circuit board, and the first radio frequency integrated circuit is electrically connected to a main board of the mobile terminal through the first connector.

14. The mobile terminal according to claim 13, wherein the first flexible circuit board is further provided with a screen driver chip and a touch detection chip, and the screen driver chip and the touch detection chip are connected to the main board through the first connector.

15. The mobile terminal according to claim 10, wherein the display module further comprises a second antenna array, a second flexible circuit board and a second radio frequency integrated circuit, wherein
the second antenna array is arranged in a second region of the screen cover plate, and the second region and the first region are located at two opposite ends of the screen cover plate; and
the second radio frequency integrated circuit is arranged on the second flexible circuit board, and is electrically connected to the second antenna array through the second flexible circuit board.

16. The mobile terminal according to claim 15, wherein a second connector is arranged on the second flexible circuit board, and the second radio frequency integrated circuit is electrically connected to a main board of the mobile terminal through the second connector.

17. The mobile terminal according to claim 11, wherein a vertical distance from each first dipole antenna element in the first antenna array to the carrier in a thickness direction of the mobile terminal is 0.37 mm.

* * * * *